(12) United States Patent
Hirooka et al.

(10) Patent No.: US 7,747,175 B2
(45) Date of Patent: Jun. 29, 2010

(54) OPTICAL TRANSMISSION METHOD AND OPTICAL TRANSMISSION APPARATUS

(75) Inventors: Toshihiko Hirooka, Sendai (JP); Masataka Nakazawa, Sendai (JP)

(73) Assignee: Japan Science and Technology Agency (JP)

( * ) Notice: Subject to any disclaimer, the term of this patent is extended or adjusted under 35 U.S.C. 154(b) by 764 days.

(21) Appl. No.: 10/543,342

(22) PCT Filed: Jan. 23, 2004

(86) PCT No.: PCT/JP2004/000589

§ 371 (c)(1), (2), (4) Date: Apr. 24, 2006

(87) PCT Pub. No.: WO2004/068747

PCT Pub. Date: Aug. 12, 2004

(65) Prior Publication Data

US 2006/0232847 A1 Oct. 19, 2006

(30) Foreign Application Priority Data

Jan. 31, 2003 (JP) .............................. 2003-023973

(51) Int. Cl.
G02B 26/00 (2006.01)
(52) U.S. Cl. .................... 398/188; 398/199; 398/159; 398/147; 398/183; 398/185; 359/279; 359/337.5; 359/338
(58) Field of Classification Search ................. 398/183, 398/185, 187–188, 199, 159, 147; 359/279, 359/337.5, 338
See application file for complete search history.

(56) References Cited

U.S. PATENT DOCUMENTS 6,333,942 B1 * 12/2001 Nakazawa et al. ............ 372/25

(Continued)

FOREIGN PATENT DOCUMENTS

EP 0817409 1/1998

(Continued)

OTHER PUBLICATIONS

M. Romagnoli, P. Franco, R. Corsini, and A. Shiffini, Time-domain Fourier otpiccs for polarization-mode dispersion compensation, Sep. 1, 1999, Optics Letters, vol. 24, Nov. 17, pp. 1197-1199.*

(Continued)

*Primary Examiner*—Ken N Vanderpuye
*Assistant Examiner*—Tanya Ngo
(74) *Attorney, Agent, or Firm*—Lowe Hauptman Ham & Berner, LLP (57) ABSTRACT

To compensate a waveform distortion by using a nature that a spectral shape is perfectly retained even if all the linear distortions occur on a time-axis. An optical pulse transmitted from an optical pulse transmitter (1) via an optical fiber transmission line (2) is transmitted. An optical Fourier transformer (3) receives an optical pulse, and optically Fourier-transforms an optical pulse on a time-axis onto a frequency-axis to reproduce the frequency spectrum of an optical pulse on a time-axis be effecting switching between frequency and time, thereby compensating a waveform distortion by a linear effect on the optical fiber transmission line (2). A photodetector (4) receives an optical pulse from the optical Fourier transformer (3) and transforms this into an electrical signal to thereby obtain a pulse waveform before a transmission over the optical fiber transmission line (2).

4 Claims, 6 Drawing Sheets

TIME-DOMAIN WAVEFORM BEFORE TRANSMISSION THROUGH OPTICAL FIBER TRANSMISSION LINE
$\Delta\tau$: FULL WIDTH AT HALF MAXIMUM OF PULSE

TIME-DOMAIN WAVEFORM AFTER TRANSMISSION THROUGH OPTICAL FIBER TRANSMISSION LINE

U.S. PATENT DOCUMENTS

| | | | |
|---|---|---|---|
| 6,879,640 B1 * | 4/2005 | Agazzi | 375/295 |
| 7,181,097 B2 * | 2/2007 | Caplan et al. | 385/14 |
| 7,352,504 B2 * | 4/2008 | Hirooka et al. | 359/327 |
| 2001/0053008 A1 * | 12/2001 | Ueno | 359/158 |
| 2002/0141016 A1 * | 10/2002 | Murai | 359/135 |
| 2002/0141694 A1 * | 10/2002 | Caplan et al. | 385/24 |
| 2003/0058504 A1 * | 3/2003 | Cho et al. | 359/161 |
| 2003/0128917 A1 * | 7/2003 | Turpin et al. | 385/24 |
| 2004/0008937 A1 * | 1/2004 | Mahgerefteh et al. | 385/37 |
| 2004/0109220 A1 * | 6/2004 | Han et al. | 359/246 |
| 2007/0273958 A1 * | 11/2007 | Hirooka et al. | 359/327 |

FOREIGN PATENT DOCUMENTS

| | | | |
|---|---|---|---|
| EP | 1171968 B1 | | 3/2000 |
| IT | EP 0 817 409 | * | 7/1998 |
| JP | 11-112425 | | 4/1999 |
| JP | 11-112425 A | * | 4/1999 |
| JP | 2001-111490 | | 4/2001 |
| JP | 2001-111490 A | * | 4/2001 |
| JP | 2002-541720 | | 12/2002 |
| WO | WO 0060776 | * | 10/2000 |
| WO | 03/058312 | | 7/2003 |

OTHER PUBLICATIONS

Partial Translation and comments for a concise explanation of the relevance of "Non-linear fiber optics", G.P. Agrawal, Yoshioka Shoten Publishing, 1997 Chapter 3 Group velocity dispersion.

"1.28 Tbit/s-70 km OTDM transmission using third and fourth order simultaneous dispersion compensation with a phase modulator" Masataka Nakazawa, Takashi Yamamoto, and Kohichi R. Tamura NTT Network Innovation Laboratories.

Abstract JP patent No. JP2002541720T Dec. 3, 2002.

"Non-linear fiber optics", G.P. Agrawal, Yoshioka Shoten Publishing, 1997 Chapter 3 Group velocity dispersion.

M. D. Pelusi, Y. Matsui and A. Suzuki, "Phase Modulation of Stretched Optical Pulses for Suppression of Third-Order Dispersion Effects in Fiber Transmission", Electron. Lett. vol. 34, pp. 1675-1677 (1998).

M. D. Pelusi, Y. Matsui and A. Suzuki, "Fourth-order Dispersion Suppression of Ultrashort Optical Pulses by Second-order Dispersion and Cosine Phase Modulation", Opt. Lett. vol. 25, pp. 296-298 (2000).

T. Yamamoto and M. Nakazawa, "Third- and Fourth-order Active Dispersion Compensation with a Phase Modulatro in a Terabit-per-second Optical Time-Division Multiplexed Transmission", Opt. Lett. vol. 26, pp. 647-649 (2001).

* cited by examiner

OPTICAL TRANSMISSION METHOD AND OPTICAL TRANSMISSION APPARATUS

CROSS-REFERENCE TO RELATED APPLICATIONS

The present Application is based on International Application No. PCT/JP2004/000589, filed on Jan. 23, 2004, which in turn corresponds to JP 2003-23973 filed on Jan. 31, 2003, and priority is hereby claimed under 35 USC §119 based on these applications. Each of these applications are hereby incorporated by reference in their entirety into the present application.

TECHNICAL FIELD

The present invention relates to optical transmission methods and optical transmission apparatuses, and more specifically, to an optical transmission method and an optical transmission apparatus for simultaneously and completely compensating for waveform distortions in a signal transmitted through an optical fiber including third-order or higher-order dispersion and time-varying dispersion or polarization-mode dispersion, by means of a Fourier transform.

BACKGROUND ART

It is widely known that linear effects such as wavelength dispersion and polarization dispersion in an optical fiber lead to distortions in a time-domain waveform such as broadening of a pulse, ripples, and a shift in position of center time. Especially in ultrahigh-speed time-division multiplexed transmission at a speed higher than or equal to 40 Gb/s per channel, waveform distortions resulting from third-order or higher-order dispersion and polarization-mode dispersion have a great effect.

Compensation for second-order dispersion by a dispersion compensating fiber or a grating, simultaneous compensation for second-order and third-order dispersion by a reverse-dispersion slope fiber, compensation for dispersion through the use of a phase-conjugate element, and others have been put forth to compensate for the effects of linear distortions in an optical fiber transmission line, and a dispersion-flattened fiber transmission line has been equivalently implemented.

Conventional technologies reported by Pelusi et al. compensate for third-order and fourth-order dispersion by applying a linear chirp to a signal by means of a fiber having an appropriate amount of second-order dispersion before transmission and then performing sinusoidal phase modulation or cosine phase modulation depending on the magnitude of third-order or fourth-order dispersion of the transmission fiber (see patent document 1, non-patent documents 1 and 2). It has been reported that other conventional technologies can compensate for third-order and fourth-order dispersion of a transmission line simultaneously by selecting appropriate amplitude and timing of cosine phase modulation (see non-patent documents 3 and 4). With these technologies, 1.28 Tb/s–70 km optical time-division multiplexed transmission can be successfully performed. Use of an optical Fourier transform has been suggested to compensate for group delay resulting from polarization-mode dispersion (non-patent document 5) to (patent document 2, non-patent document 5).

Patent document 1: JP 2001-111490A

Patent document 2: JP 2002-541720A

Non-Patent Document 1
 M. D. Pelusi, Y. Matsui, and A. Suzuki, "Phase modulation of stretched optical pulses for suppression of third-order dispersion effects in fiber transmission," Electron. Lett. Vol. 34, pp. 1675-1677 (1998)

Non-Patent Document 2
 M. D. Pelusi, Y. Matsui, and A. Suzuki, "Fourth-order dispersion suppression of ultrashort optical pulses by second-order dispersion and cosine phase modulation," Opt. Lett. Vol. 25, pp. 296-298 (2000)

Non-Patent Document 3
 T. Yamamoto and M. Nakazawa, "Third- and fourth-order active dispersion compensation with a phase modulator in a terabit-per-second optical time-division multiplexed transmission," Opt. Lett. Vol. 26, pp. 647-649 (2001)

Non-Patent Document 4
 M. Nakazawa, T. Yamamoto, and K. R. Tamura, "1.28 Tbit/s–70 km OTDM transmission using third- and fourth-order simultaneous dispersion compensation with a phase modulator," ECOC 2000, PD. 2.6

Non-Patent Document 5
 M. Romagnoli, P. Franco, R. Corsini, A. Schffini, and M. Midrio, "Time-domain Fourier optics for polarization-mode dispersion compensation," Opt. Lett. Vol. 24, pp. 1197-1199 (1999)

DISCLOSURE OF INVENTION

It is generally recognized that dispersion compensation by a fiber is easy while simultaneous compensation for wavelength dispersion including third-order dispersion is difficult, because the technique requires matching of a ratio of second-order dispersion to third-order dispersion. If a phase-conjugate element is used, only even-numbered-order dispersion can be compensated for. If pre-transmission dispersion compensation by phase modulation is performed, a precise dispersion value of the whole transmission line must be obtained before phase modulation is adjusted.

The conventional techniques use a constant amount of dispersion compensation and cannot vary the amount of dispersion compensation dynamically with the dispersion value varying with time. Accordingly, an adaptive equalization scheme has been required. The conventional techniques cannot compensate for polarization-mode dispersion.

Unlike the conventional techniques for compensating for waveform distortions completely in the time domain, a technique according to the present invention compensates for waveform distortions by taking advantage of characteristics in which the spectral profile remains unchanged even if any type of linear distortion occurs in the time domain, to solve these issues all at once. In other words, an objective of the present invention is to reproduce an original signal waveform with few linear distortions or without linear distortions, by Fourier-transforming the spectral profile of a transmitted optical signal to one bit in the time domain, and to implement substantially distortion-free optical fiber transmission.

The present invention provides an optical transmission method for performing digital modulation of an optical pulse at a transmission end, propagating the pulse through an optical fiber transmission line, and converting the pulse to an electric signal by means of a photoreceiver, the optical transmission method using an optical Fourier transform circuit placed before the photoreceiver, a pulse whose time-domain waveform is equal to the spectral profile, and transform-limited in which product of the full width at half maximum and the frequency spectral width satisfies the Fourier limit condition is used as the optical pulse transmitted, and the optical Fourier transform circuit converting the time-domain waveform of the optical pulse transmitted through the optical fiber transmission line to a profile of a frequency spectrum to remove all linear time-domain distortions given to the optical pulse in the optical fiber, by taking advantage of the characteristic of maintaining the profile of the frequency spectrum, and replacing the frequency of the frequency spectrum with time, to compensate for time-domain waveform distortions of the optical pulse caused by the optical fiber transmission line. The present invention also provides an optical transmission apparatus including the optical Fourier transform circuit and the photoreceiver.

ADVANTAGES

The present invention enables simultaneous and complete compensation or nearly complete compensation for linear distortions of a time-domain waveform caused by third-order or higher-order dispersion and time-varying dispersion or polarization-mode dispersion, which used to be hard to compensate, so that the transmission capacity and transmission distance of optical fiber communication can be increased.

The present invention also enables practical and economical optical fiber communication to be implemented, eliminating the need for compensating for dispersion of an optical fiber or polarization-mode dispersion precisely.

BEST MODE FOR CARRYING OUT THE INVENTION

An embodiment of the present invention is described below in detail with reference to the drawings.

1. System Configuration and Operation

Figure 1:
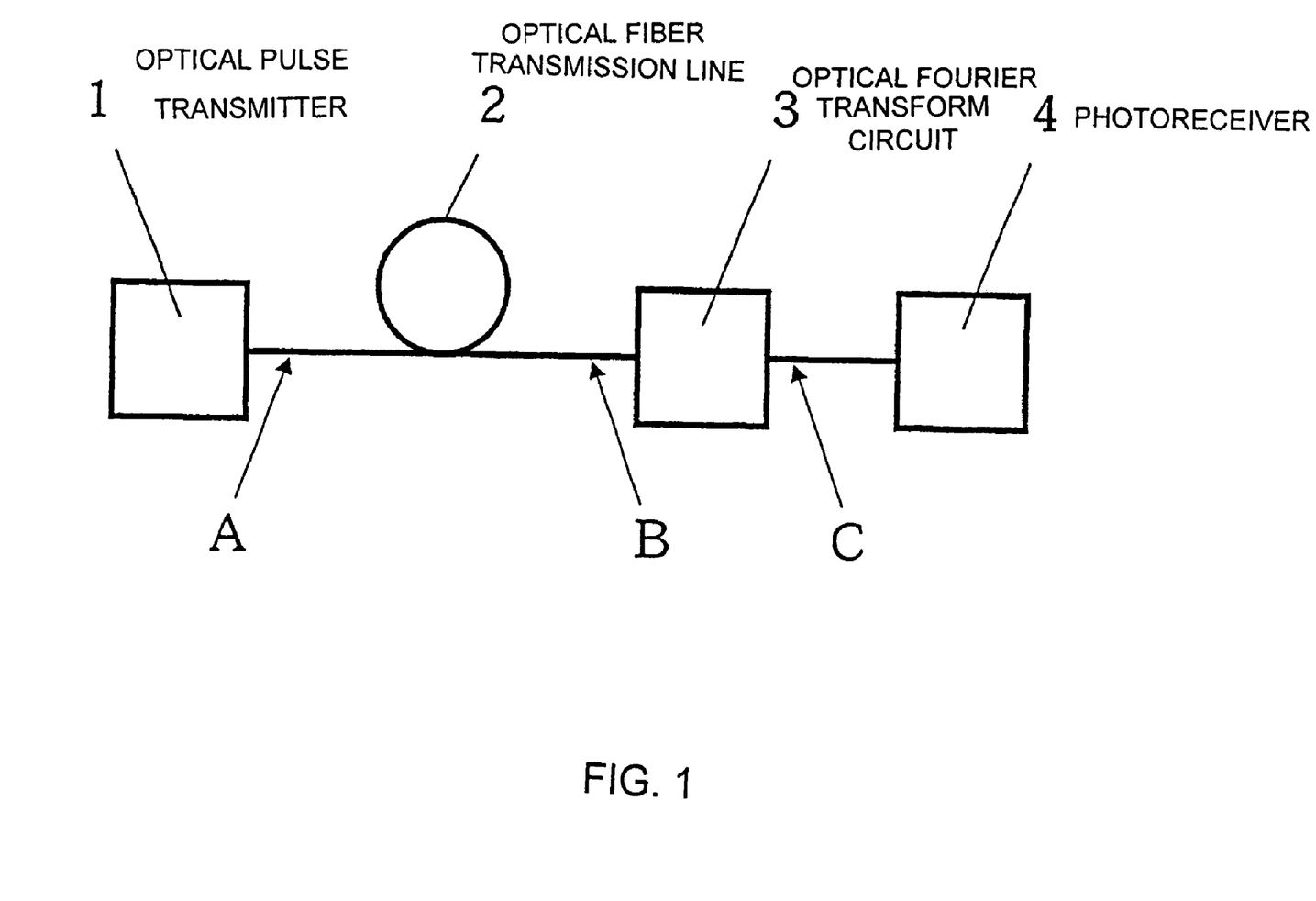
FIG. 1 shows an optical Fourier transmission system according to an embodiment of the present invention.

FIG. 1 shows an embodiment of an optical Fourier transmission system according to the present invention. The optical Fourier transmission system includes an optical pulse transmitter 1, an optical fiber transmission line 2, an optical Fourier transform circuit 3, and a photoreceiver 4. As an optical receiver, an optical transmission apparatus includes the optical Fourier transform circuit 3 and the photoreceiver 4.

The optical pulse transmitter 1 converts an electric signal carrying information to be transmitted into an optical signal, through digital modulation of an optical pulse generated from a light source by an electric signal, and emits a train of optical pulses carrying the information into the optical fiber transmission line 2. It is preferable that the product of the pulse width and the spectral width satisfy the condition of being at the Fourier limit ($\Delta v \Delta \tau \cong 0.441$ for a Gaussian pulse and $\Delta v \Delta \tau \cong 0.315$ for a sech pulse, where $\Delta v$ indicates spectral width and $\Delta \tau$ indicates time-domain pulse width). An optical pulse having the best spectral width with respect to the time-domain waveform is called a Fourier-limited pulse (hereafter referred to as a transform-limited pulse). With the transform-limited optical pulse, ideal optical Fourier transmission can be implemented with the best performance.

The optical fiber transmission line 2 is a transmission line including various kinds of optical fibers having arbitrary dispersion and polarization-mode dispersion. The amounts of these types of dispersion may vary with time.

The optical Fourier transform circuit 3 receives an optical pulse transmitted through the optical fiber transmission line 2 and Fourier-transforms the pulse train in the time domain to a spectrum in the frequency domain. In high-speed time-division multiplexing, the optical Fourier transform circuit 3 may perform Fourier transform after the signal is demultiplexed to low-rate signals.

The photoreceiver 4 receives an optical pulse in which dispersion and polarization-mode dispersion caused by the optical fiber transmission line 2 has been compensated for by the optical Fourier transform circuit 3 and converts the pulse into an electric signal. The photoreceiver 4 is a PIN, an APD, and any other appropriate photodetector.

An overview of the operation of the optical Fourier transmission system is given below. An optical signal transmitted through the optical fiber transmission line 2 is generally an optical time-division multiplexed signal. In the operation of the present embodiment, an optical pulse train making up a time-division multiplexed signal is input to the optical Fourier transform circuit 3. Each pulse of the optical pulse train will be described below.

Figure 2A:
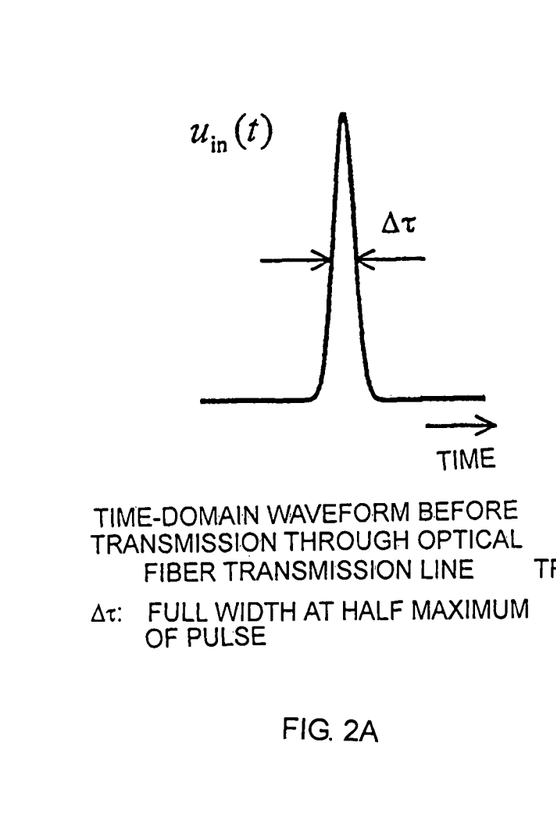
FIG. 2 shows a time-domain waveform of an optical pulse.
Figure 2B:
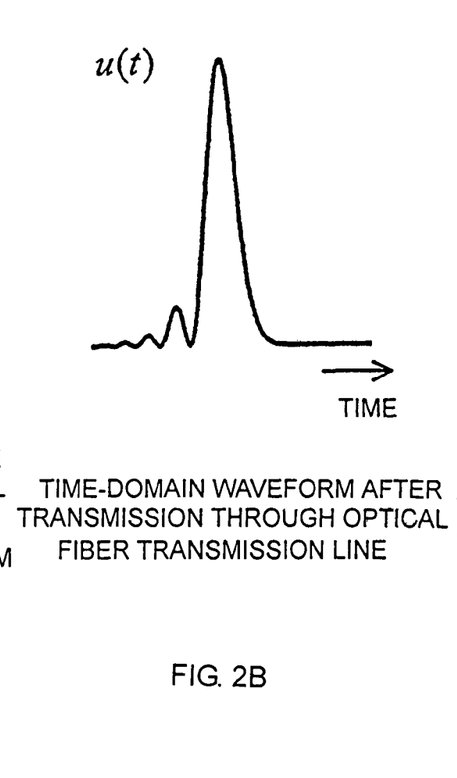
Figure 2C:
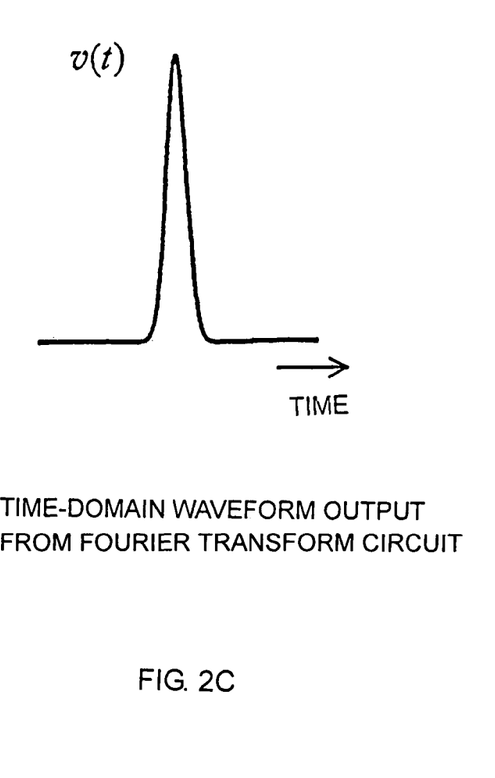

FIG. 2 shows time-domain waveforms of an optical pulse. FIGS. 2(a), 2(b), and 2(c) show overviews of the time-domain waveforms of the optical pulse respectively at points A, B, and C of the optical fiber transmission line shown in FIG. 1.

Figure 3A:
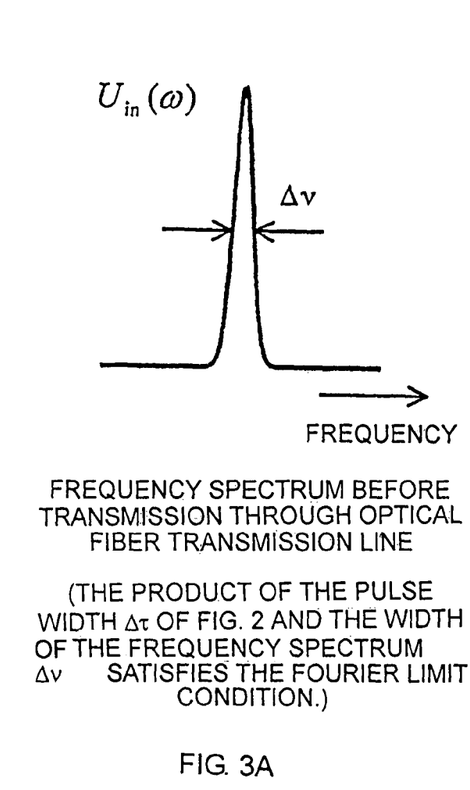
FIG. 3 shows the profile of the frequency spectrum of the optical pulse.
Figure 3B:
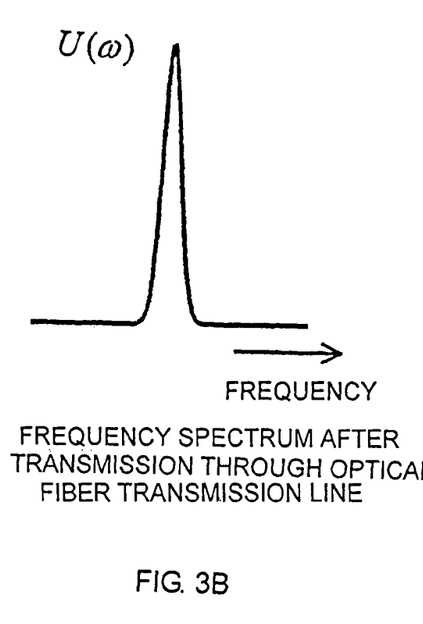
Figure 3C:
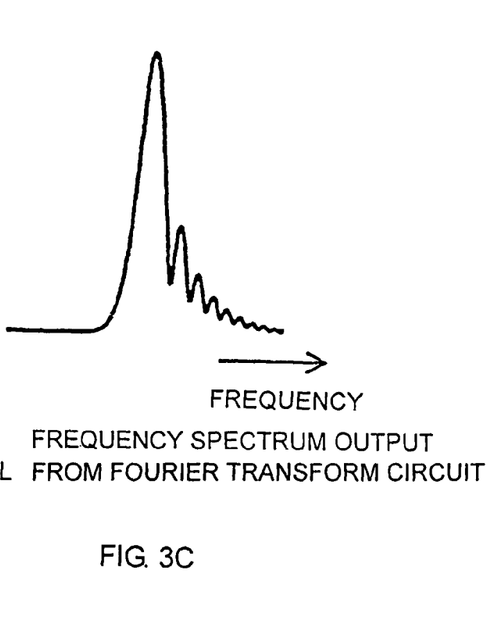

FIG. 3 shows the profiles of the frequency spectra of the optical pulse. FIGS. 3(a), 3(b), and 3(c) show overviews of the frequency spectra of the optical pulse respectively at points A, B, and C of the optical fiber transmission line shown in FIG. 1.

The optical pulse transmitter 1 converts an electric signal to an optical pulse, and the optical pulse enters and travels through the optical fiber transmission line 2. It is preferable that the optical pulse transmitter 1 shapes the frequency spectrum $U_{in}(\omega)$ of the optical pulse (FIG. 3(a)), so that the optical pulse has the time-domain waveform $u_{in}(t)$ (FIG. 2(a)) of a Fourier-limited pulse (transform-limited pulse) when the pulse enters the optical fiber transmission line 2.

The optical pulse traveling through the optical fiber transmission line 2 usually undergoes complicated linear distortions resulting from dispersion and polarization-mode dispersion of the optical fiber transmission line 2. These distortions determine the transmission performance of the conventional optical communication. The present embodiment, however, allows, as a main feature, the original waveform to be reproduced completely in the frequency domain because the envelope profile of the spectrum input to the optical fiber transmission line 2 is not deformed at all by dispersion and polarization-mode dispersion of the optical fiber transmission line 2. The effect of dispersion in an optical fiber is converted to a phase shift in each frequency component of the spectrum, but the photodetector detects just the envelope. Accordingly, the phase shift presents no problem. A key is that the optical Fourier transform circuit reproduces a frequency spectrum $U(\omega)$ (FIG. 3(b)) in the time domain, from a time signal u(t) (FIG. 2(b)) affected by linear distortions in the optical fiber transmission line 2.

In other words, the time-domain waveform of a transmitted optical pulse goes through the optical Fourier transform circuit 3, and the frequency spectrum of the optical pulse is reproduced in the time domain by replacing time with frequency. This allows the frequency spectrum (FIG. 3(a)) of the optical pulse input to the optical fiber transmission line 2 at point A shown in FIG. 1 to be completely reproduced at an output end (FIG. 2(c)). The optical pulse passing through the optical Fourier transform circuit 3 is converted back to an electric signal by the photoreceiver 4 and is taken out as a signal. This optical transmission method is named as "optical Fourier transmission."

Figure 4:
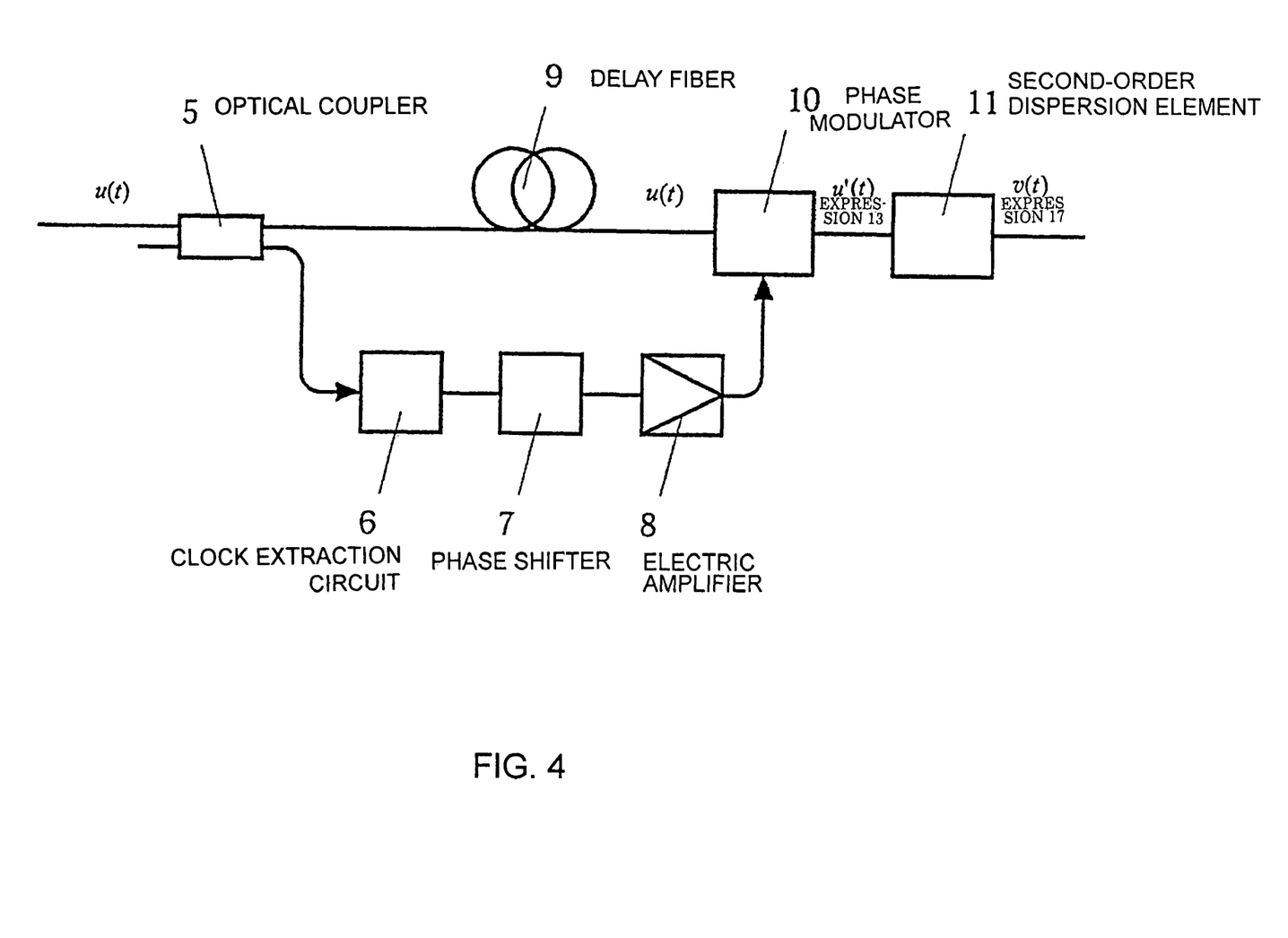
FIG. 4 shows the configuration of an optical Fourier transform circuit 3.

FIG. 4 shows the configuration of the optical Fourier transform circuit 3. The optical Fourier transform circuit 3 includes an optical coupler 5, a clock extraction circuit 6, a phase shifter 7, an electric amplifier 8, a delay fiber 9, a phase modulator 10, and a second-order dispersion element 11.

As the phase modulator 10, a phase modulator using the electrooptic effect of $LiNbO_3$ and others is recommended, for instance. The phase modulator 10 may also use the phase modulation effect of electroabsorption (EA) or a semiconductor optical amplifier (SOA). Although many phase modulators 10 have polarization dependence, it is preferable that polarization is eliminated by using a polarization-free optical device or a polarization diversity method. The driving frequency of the phase modulator 10 is the pulse transmission rate.

The optical coupler 5 separates a portion of the transmission signal into two parts, one part to the delay fiber 9 and the other part to the clock extraction circuit 6, so that the phase modulator 10 performs phase modulation in synchronization with the pulse transmitted through the optical fiber transmission line 2. The clock extraction circuit 6 extracts a clock signal (a sinusoidal signal) from the transmission signal and drives the phase modulator 10 at the obtained clock frequency through the phase shifter 7 and the electric amplifier 8. The phase shifter 7 and the delay fiber 9 function to ensure that optimal phase modulation takes place in synchronization with the optical pulse. If the timing of modulation changes because of a change in temperature, the phase shifter 7 can automatically adjust the amount of the phase shift so that optimum modulation can be performed. The electric amplifier 8 outputs a drive signal for driving the phase modulator 10, depending on the output of the phase shifter 7.

The second-order dispersion element 11 can be a single-mode optical fiber having group velocity dispersion with zero-dispersion region near the 1.3-μm band, a pair of diffraction gratings, a fiber Bragg grating, a VIPA variable dispersion compensator, an arrayed waveguide grating, a combination of a diffraction grating and a spatial modulator, and others, for instance.

A stand-alone optical Fourier transform circuit has been originally designed to compensate for group delay caused by polarization-mode dispersion, as described in a paper and others on optical Fourier transform, written by Romagnoli et al. (patent document 2, non-patent document 5). In the previous technique discussed in that paper and others, the optical Fourier transform circuit is used to compensate for polarization-mode dispersion alone. The concept has not reached an idea of performing distortion-free transmission by replacing time with frequency as implemented by the optical Fourier transform circuit 3 of the present embodiment. The present invention offers a new principle and technique of optical Fourier transmission that eliminates all linear distortions by converting distortions in the time domain into the spectrum.

2. Details of Compensation for Waveform Distortions

Described below in further detail is how the optical Fourier transmission method is used to compensate for waveform distortions of an optical pulse caused by the linear effects of an optical fiber transmission line having arbitrary dispersion and polarization-mode dispersion, in the configuration of the present embodiment.

If the pulse envelope varies more slowly than the carrier frequency, pulse propagation in the optical fiber is described by envelope approximation. The slowly-varying field envelope amplitude of the pulse is represented as u(z, t); the propagation constant in the medium is represented as $\beta(\omega)$; the frequency of the carrier wave will be represented as $\omega_0$; where t is time, z is the position (coordinates) in the longitudinal direction of the optical fiber, and ω is frequency. The electric field e(z, t) in the optical fiber is expressed as:

$$e(z,t)=u(z,t)exp[i(\beta(\omega)z-\omega_0 t)] \quad (1)$$

where β is given by:

$$\beta = \beta_0 + \beta_1(\omega - \omega_0) + \frac{\beta_2}{2!}(\omega - \omega_0)^2 + \frac{\beta_3}{3!}(\omega - \omega_0)^3 + \ldots \quad (2)$$
$$= \beta_0 + \sum_{n=1}^{\infty} \frac{\beta_n}{n!}(\omega - \omega_0)^n$$

In the equation, $\beta_0, \beta_1, \ldots, \beta_n$ are given below:

$$\beta_0 = \beta(\omega_0), \beta_1 = \frac{\partial \beta}{\partial \omega}\bigg|_{\omega_0}, \beta_2 = \frac{\partial^2 \beta}{\partial \omega^2}\bigg|_{\omega_0}, \beta_3 = \frac{\partial^3 \beta}{\partial \omega^3}\bigg|_{\omega_0}, \ldots,$$
$$\beta_n = \frac{\partial^n \beta}{\partial \omega^n}\bigg|_{\omega_0}$$

The optical electric field e(z, t) in a dispersive medium such as an optical fiber satisfies the Maxwell's equation:

$$\frac{\partial^2 e}{\partial z^2} - \frac{\beta^2}{\omega_0^2}\frac{\partial^2 e}{\partial t^2} = 0 \quad (3)$$

Therefore, the frequency spectrum E(z, ω) of the optical electric field e(z, t) satisfies the following equation (the frequency spectrum may be referred to simply as the spectrum):

$$\frac{\partial^2 E}{\partial z^2} + \beta^2(\omega)E = 0 \quad (4)$$

where E(z, ω) is given by:

$$E(z, \omega) = \int_{-\infty}^{\infty} e(z, t)\exp(i\omega t)dt \quad (5)$$

The spectral width of the pulse is not so large in comparison with the carrier frequency, so that $\omega^2$ is approximated as $\omega_0^2$ in the equation 4.

An equation about the envelope u(z, t) is important.

A Fourier transform $U(z, \omega-\omega_0)$ of u(z, t) will be considered. With the equations 1 and 5, $E(z, \omega)$ can be rewritten as:

$$E(z,\omega)=U(z,\omega-\omega_0)exp(i\beta(\omega_0)z) \quad (6)$$

where $U(z, \omega-\omega_0)$ is given by:

$$U(z, \omega - \omega_0) = \int_{-\infty}^{\infty} u(z, t)\exp[i(\omega - \omega_0)t]dt \quad (7)$$

If the equation 6 is substituted into the equation 4, if the second differential of z is ignored because $U(z, \omega-\omega_0)$ changes gradually with respect to z, and if $$\beta^2-\beta_0^2 \approx 2\beta_0(\beta-\beta_0)$$

is used, the following propagation equation satisfied by $U(z, \omega-\omega_0)$ is obtained:

$$\frac{\partial U}{\partial z} = i[\beta(\omega) - \beta_0]U \quad (8)$$

Based on the equation 2, the basic equation in the time domain can be expressed as:

$$i\frac{\partial U}{\partial z} + \sum_{n=1}^{\infty} \frac{\beta_n}{n!}(\omega - \omega_0)^n U = 0 \quad (9)$$

An inverse Fourier transform of the equation 9 yields the following linear wave equation satisfied by u(z, t) finally:

$$i\frac{\partial u}{\partial z} + \sum_{n=1}^{\infty} \frac{i^n \beta_n}{n!} \frac{\partial^n u}{\partial t^n} = 0 \quad (10)$$

where u(z, t) is given by:

$$u(z, t) = \frac{1}{2\pi}\int_{-\infty}^{\infty} U(z, \omega - \omega_0)\exp[-i(\omega - \omega_0)t]d(\omega - \omega_0) \quad (11)$$

In the subsequent part, $(\omega-\omega_0)$ will be defined as $\omega$. Now, distortions of the time-domain waveform of a pulse caused by the linear effects of a transmission line are completely expressed by the equation 10.

In the frequency domain, however, the optical signal generally undergoes just a phase change under any linear effects, and the spectral profile is completely maintained (see equation 12 below). The time-domain waveform of an optical pulse input to an optical fiber transmission line 2 having a length z=ξ from the optical pulse transmitter 1 will be represented as $u_{in}(t)$ (=u(0, t)), and the frequency spectrum of the pulse will be represented as $U_{in}(\omega)$ (=U(0, ω)). The time-domain waveform of a signal affected by linear distortions in the optical fiber transmission line 2 will be represented as u(t) (=u(z, t)), and the frequency spectrum of the signal will be represented as U(ω) (=U(z, ω)). The integration of the equation 8 yields the following spectrum after propagation through the fiber having a length of ξ:

$$U(\xi,\omega)=U_{in}(\omega))exp[i\beta(\omega)\xi] \quad (12)$$

The equation indicates that the spectral profile is maintained, except for the phase change $exp[i\beta(\omega)\xi]$.

The optical Fourier transform circuit 3 obtains the frequency spectrum $U(\xi,\omega)$ from the time-domain waveform $u(\xi, t)$ at the receiver side B of the optical fiber transmission line 2 having a length of ξ, in the method described below. In the subsequent part, $u(\xi, t)$ will be expressed as u(t), and $U(\xi, \omega)$ will be expressed as U(ω).

A time-domain signal after a parabolic phase modulation $exp(iKt^2/2)$ of the transmitted pulse signal u(t) by the phase modulator 10 is given by multiplying u(t) by the amount of phase change:

$$u'(t)=u(t)exp(iKt^2/2) \quad (13)$$

The input waveform of the phase modulator 10 is u(t), and the output waveform is u'(t) obtained by the equation 13. The processing of the phase modulator 10 corresponds to the multiplication of the input waveform u(t) by the phase exp $(iKt^2/2)$ on the right side of the equation 13. The chirp rate K is given to the phase modulator 10 in advance as a parameter. This parameter can be controlled, depending on the magnitude of the voltage applied to the phase modulator. The timing of phase modulation and the driving frequency are extracted from and adjusted to the transmission signal, by using the clock extraction circuit 6, the phase shifter 7, and the delay fiber 9.

If v(t) is a signal after propagation through dispersion k"L by the second-order dispersion element 11, v(t) is given as follows, as a time-domain waveform of u'(t) after propagation through the second-order dispersion (element) expressed as D=k"L:

$$v(t) = \frac{1}{2\pi}\int_{-\infty}^{\infty}\left[\int_{-\infty}^{\infty} u(t')\exp(iKt'^2/2)\exp(i\omega t')dt'\right] \quad (14)$$
$$\exp(iD\omega^2/2)\exp(-i\omega t)d\omega$$
$$= \frac{1}{2\pi}\int\int u(t')\exp[iD\omega^2/2 + i\omega(t' - t) + iKt'^2/2]dt'd\omega$$

The input waveform of the second-order dispersion element 11 is u'(t) obtained by the equation 13, and the output waveform is v(t) obtained by the equation 14. The output waveform v(t) is obtained by applying the second-order dispersion function $exp(iD\omega^2/2)$ to the Fourier-transformed u'(t) in the frequency domain and by inverse-transforming the whole. The second-order dispersion function is obtained by substituting $D\omega^2/2$ for $\beta(\omega)$ in the equation 12.

Next, the phase modulation parameter K of the phase modulator is selected to satisfy K=1/D. By substituting T for (t'−t), the equation 14 can be rewritten as follows:

$$v(t) = \frac{1}{2\pi}\int_{-\infty}^{\infty} u(t+T)\exp[i(t+T)^2/2D]dT \quad (15)$$
$$\int_{-\infty}^{\infty} \exp[iD\omega^2/2 + i\omega T]d\omega$$
$$= \frac{1}{2\pi}\int_{-\infty}^{\infty} u(t+T)\exp[i(t+T)/2D]dT$$

-continued $$\int_{-\infty}^{\infty} \exp[iD(\omega+T/D)^2/2 - iT^2/2D]d\omega$$

$$= \frac{1}{2\pi}\int_{-\infty}^{\infty} u(t+T)\exp[i(t^2+2Tt)/2D]\sqrt{2\pi/iD}\,dT$$

$$= \frac{1}{\sqrt{2\pi iD}}\exp(it^2/2D)\int_{-\infty}^{\infty} u(t+T)\exp(iTt/D)\,dT$$

$$= \frac{1}{\sqrt{2\pi iD}}\exp(-iKt^2/2)U(t/D)$$

The equation 15 indicates that the output time-domain waveform v(t) (FIG. 2(c)) of the optical Fourier transform circuit 3 is proportional to the spectrum $U(\omega)$ (FIG. 3(b)) of the input waveform to the optical Fourier transform circuit 3. Here, $$\omega=t/D \tag{16}$$

In other words, the output time-domain waveform v(t) of the optical Fourier transform circuit 3 corresponds to the spectral profile $U(\omega)$ of the input waveform of the optical Fourier transform circuit 3 when the scale of the time is converted to $t/D=\omega$.

Because the linear transmission maintains the spectrum, as expressed by the equation 12, the envelope profile of the spectrum $U(\omega)$ at the receiver side B (FIG. 3(b)) agrees with the envelope profile of the spectrum $U(0, \omega))$ $(=U_{in}(\omega))$ of the signal at the transmitter side A. With equations 12 and 15, v(t) is expressed with the spectrum $U_{in}$ of the signal input to the optical fiber transmission line 2, as follows:

$$v(t) = \frac{1}{\sqrt{2\pi iD}} U_{in}(t/D)\exp(-iKt^2/2 + i\beta(t/D)\xi) \tag{17}$$

With v(t), the profile of the input spectrum $U_{in}(\omega)$ can be reproduced at the output. It has already been known that a combination of the phase modulator 10 and the second-order dispersion element 11 can generate a Fourier-transformed image of an optical pulse, but the present invention has such a distinctive feature that waveform-distortion-free transmission can be implemented by an apparatus for optical Fourier transform.

If the signal has the waveform of a transform-limited pulse, the time-domain waveform can be directly obtained from the frequency spectrum. Suppose that the time-domain waveform of a signal input to the optical fiber transmission line 2 has a Gaussian waveform $u_{in}(t)=A\exp(-t^2/2T_0^2)$ of a transform-limited pulse. A Fourier transform does not change the function form of the waveform of the Gaussian pulse, as well as that of a sech pulse. The spectrum is given by:

$$U_{in}(\omega) = \int_{-\infty}^{\infty} u_{in}(t)\exp(i\omega t)\,dt \tag{18}$$

$$= \sqrt{2\pi T_0^2}\,A\exp(-T_0^2\omega^2/2)$$

The output waveform of the optical Fourier transform circuit 3 is given by substituting t/D for $\omega$ in the equation 17:

$$v(t)=\sqrt{T_0^2/iD}A\exp(-T_0^2t^2/2D^2)\exp(-iKt^2/2+i\beta(t/D)\xi) \tag{19}$$

If the absolute value of the second-order dispersion is selected as $|D|=T_0^2$, the equation 19 is rewritten as:

$$v(t)=\sqrt{1/i\mathrm{sgn}(k''')}A\exp(-t^2/2T_0^2)\exp(-iKt^2/2+i\beta(t/T_0^2)\xi) \tag{20}$$

A typical photodetector contained in the photoreceiver 4 detects a optical electric field intensity $I(t)=|v(t)|^2$. Therefore, the time-domain waveform $u_{in}(t)=A\exp(-t^2/2T_0^2)$ at the transmitter side A (FIG. 2(a)) can be directly reproduced from v(t) of the equation 20:

$$|v(t)|^2=A^2\exp(-t^2/T_0^2)$$

For a Gaussian waveform, if $|D|=T_0^2$ is selected, the spectrum $U_{in}(t/D)$ directly corresponds to the time-domain waveform $u_{in}(t)$ in the equation 17. Accordingly, the time-domain waveform before affected by the linear effects of the optical fiber transmission line can be reproduced at the output end C in the time domain directly with preciseness or completely.

If the waveform is not Gaussian, the intensity $I(t)=|v(t)|^2$ of the optical electric field is obtained from the output of the photoreceiver 4 as follows:

$$|v(t)|^2 = \frac{1}{2\pi D}|U_{in}(t/D)|^2$$

What is important in this method is that any linear transmission distortion is compensated for, independently of the type and the magnitude. Accordingly, the magnitude of the dispersion value, the dynamic variation with time, and the order of dispersion are irrelevant. This method can be equally applied to soliton and other non-linear pulse transmission if the spectral shape is maintained after propagation. Because a soliton transmission pulse has a transform-limited relationship between the time width $\Delta\tau$ and the spectrum width $\Delta\nu$, this method is applicable. Dispersion-managed (DM) soliton transmission can also use this method at a position of the shortest pulse where a chirp is zero or by inserting an appropriate fiber to bring the chirp to zero.

3. Example of Compensation for Waveform Distortions

Figure 5:
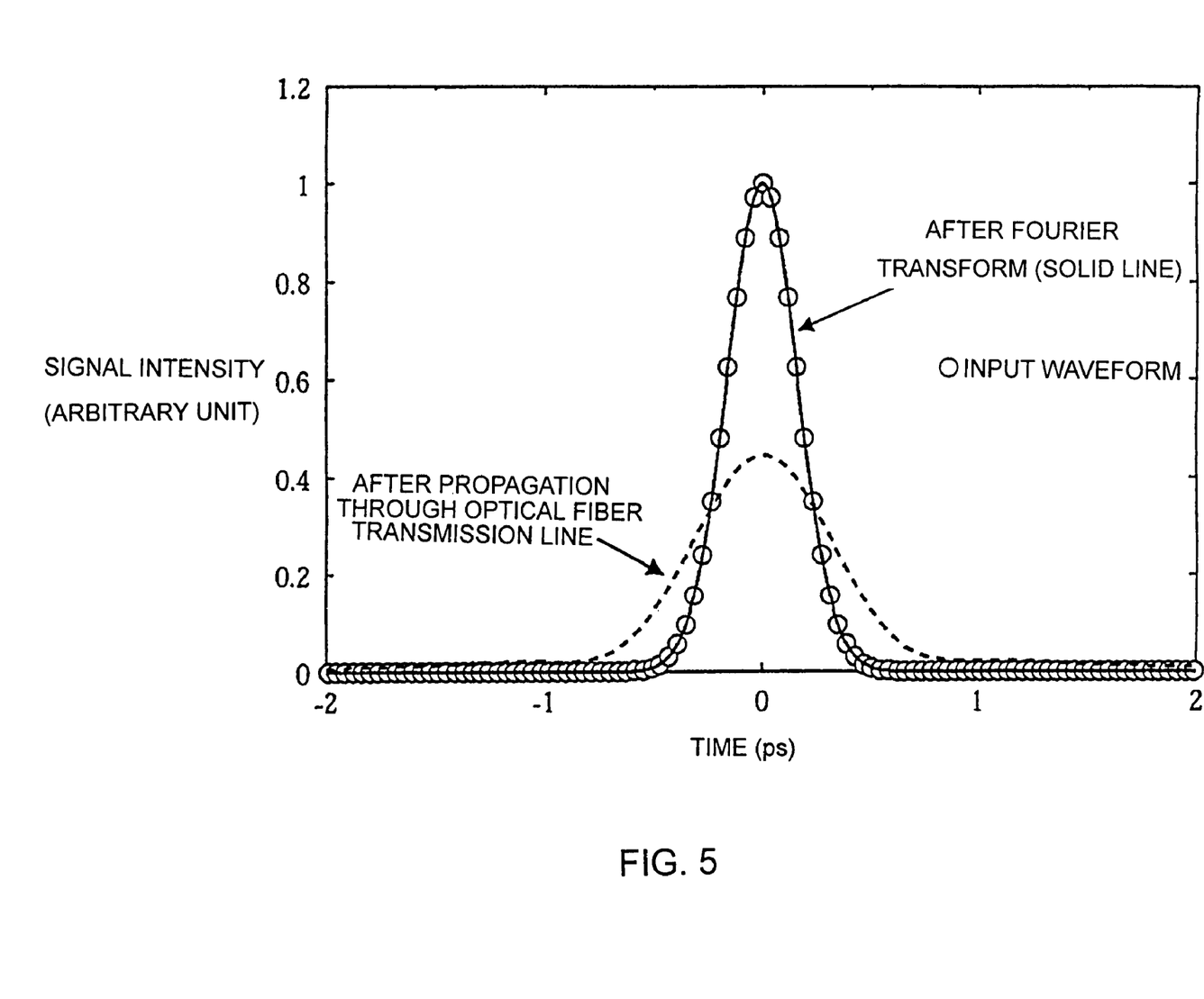
FIG. 5 shows a waveform distortion of an optical pulse and the effects of compensation.

FIG. 5 shows a waveform distortion of an optical pulse and the effects of compensation. The graph shows the results of numerical calculations performed to confirm the effects of dispersion compensation by the optical Fourier transmission method of the present embodiment, by using the experimental parameters indicated in the non-patent document.

4. In the figure, a series of circles, a broken line, and a solid line represent time-domain waveforms of an optical signal respectively at point A (before transmission through the optical fiber transmission line 2), point B (after transmission), and point C (output of the optical Fourier transform circuit 3) shown in FIG. 1.

The time-domain waveform at point A in FIG. 1 is assumed to be of a Gaussian pulse with 380-fs full width at half maximum, for instance. It is assumed that the accumulated dispersion of fibers having a length $\xi$ of 69.4 km included in the optical fiber transmission line is:

$\beta_2\xi=-0.0037$ ps$^2$ $\beta_3\xi=-0.0038$ ps$^3$ $\beta_4\xi=0.0058$ ps$^4$ and $T_0=228$ fs For the compensation for dispersion of the transmission line, the optical Fourier transform circuit requires the following dispersion amount and phase modulation parameter:

$$|D|(=1/|K|)=T_0^2=0.052 \text{ ps}^2$$

If a single-mode optical fiber with zero dispersion at 1.3 μm (k″=−20 ps²/km) is used as a second-order dispersion element of the optical Fourier transform circuit, a length of 2.6 m is required. This method also allows the waveform to be easily reproduced by using a single phase modulator and a short fiber. The chirp rate of the phase modulator is:

$$K=1/D=-19.2 \text{ ps}^{-2}$$

Because the value of $\beta_4$ is large in the transmission line, the fourth-order dispersion is dominant. Prior to dispersion compensation by the optical Fourier transform circuit, the waveform is greatly distorted by the fourth-order dispersion in such a manner that the pulse is broadened symmetrically with respect to time. The graph shows that the time-domain waveform input to the transmission line is reproduced precisely after the Fourier transform of this method.

Figure 6:
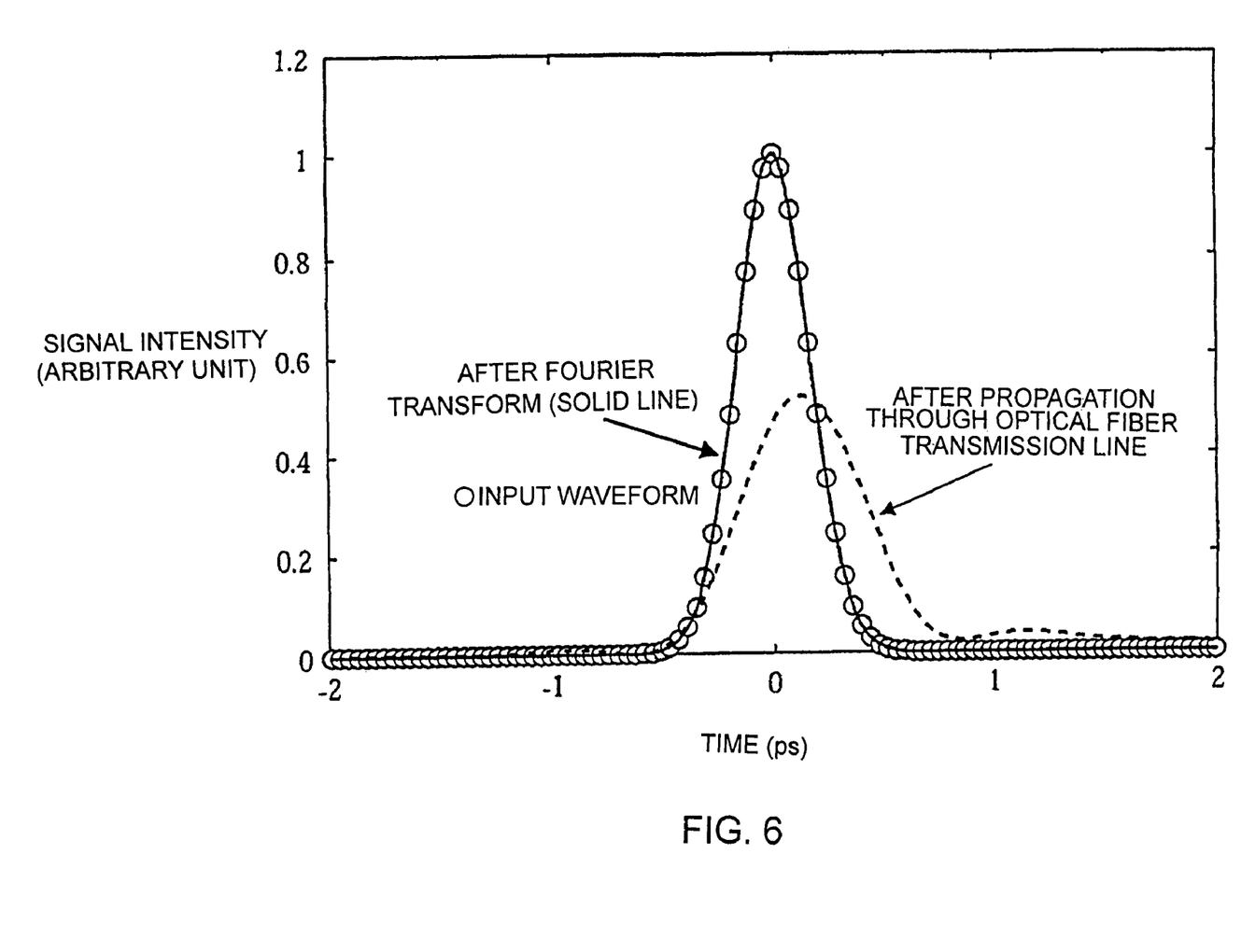
FIG. 6 shows other results of numerical calculations related to a waveform distortion of an optical pulse and the effects of compensation.

FIG. 6 shows other results of numerical calculations related to a waveform distortion of an optical pulse and the effects of compensation. This graph shows the results of numerical calculations conducted to confirm the effects of the present embodiment. In the figure, a series of circles, a broken line, and a solid line represent time-domain waveforms of an optical signal respectively at points A, B, and C shown in FIG. 1. It is assumed that the time-domain waveform at point A in FIG. 1 is of a Gaussian pulse with a 380-fs full width at half maximum, and that the accumulated dispersion of 69.4-km fibers in the optical fiber transmission line is:

$\beta_2 \xi = -0.0037 \text{ ps}^2$
$\beta_3 \xi = 0.1 \text{ ps}^3$
$\beta_4 \xi = -0.0058 \text{ ps}^4$ In comparison with the dispersion characteristics shown in FIG. 5, the fourth-order dispersion of the transmission line has the opposite sign, and the third-order dispersion has been substantially increased. The graph clearly shows that the influence of the third-order dispersion is significant and that the pulse is distorted asymmetrically with respect to time prior to dispersion compensation by the optical Fourier transform circuit. After the dispersion compensation by the optical Fourier transform circuit of this method, the time-domain waveform input to the optical fiber transmission line can be correctly reproduced.

INDUSTRIAL APPLICABILITY

As described above in detail, according to the present invention, the time-domain waveform of an optical pulse train affected by linear distortions in an optical fiber transmission line can be converted to an invariant frequency spectrum, the spectrum of the signal input to the transmission line can be reproduced, and the information can be directly taken out, by using an optical Fourier transform circuit including a phase modulator and a second-order dispersion element. Accordingly, the optical Fourier transmission method according to the present invention enables information to be transmitted correctly, independently of the propagation characteristics of the optical fiber transmission line.

According to the present invention, waveform distortions of the time-domain waveform of an optical pulse, caused by the linear effects of an optical fiber transmission line having third-order or higher-order dispersion and time-varying dispersion or polarization-mode dispersion can be compensated for simultaneously and completely, and the transmission capacity and the transmission distance of optical fiber communication can be increased. Because precise control of dispersion and polarization-mode dispersion of the optical fiber transmission line is not necessary, practical and economical optical fiber communication can be implemented.

The invention claimed is:

1. An optical transmission method in a system for performing digital modulation of an optical pulse at a transmission end, propagating the pulse through an optical fiber transmission line, and converting the pulse to an electric signal by a photoreceiver, wherein the optical transmission method comprises:
   propagating the optical pulse which has time-domain waveform equal to an envelope profile of a frequency spectrum in a function form, and is transform-limited in which a product of the full width at half maximum and the frequency spectral width satisfies the Fourier limit conditions through the optical fiber transmission line;
   converting the time-domain waveform of the optical pulse transmitted through the optical fiber transmission line to a profile of the frequency spectrum by an optical Fourier transform circuit disposed before the photoreceiver, to generate a time-domain waveform whose shape is equivalent to the frequency spectrum of the signal before transmission and to eliminate all linear time domain distortions in the optical pulse by maintaining the envelope profile of the frequency spectrum before and after transmission in the optical fiber; and thereby,
   reproducing the original signal waveform at a receiving end without changing a group velocity dispersion D and a chirp rate K, which are parameters of the optical Fourier transform circuit, depending on the distortion.

2. An optical transmission method according to claim 1, wherein third-order or higher-order dispersion causing pulse distortions in the optical fiber are completely compensated for.

3. An optical transmission method according to claim 1, wherein distortion-free optical transmission is implemented, independently of variation in arbitrary dispersion or polarization-mode dispersion with time.

4. An optical transmission apparatus for performing digital modulation of an optical pulse at a transmitter side, propagating the pulse through an optical fiber transmission line, and converting the pulse to an electric signal by a photoreceiver, the optical transmission apparatus comprising:
   a photoreceiver; and
   an optical Fourier transform circuit placed before the photoreceiver;
   wherein the optical Fourier transform circuit converts the time-domain waveform of the optical pulse transmitted through the optical fiber transmission line to a profile of a frequency spectrum, to eliminate all linear time-domain distortions given to the optical pulse in the optical fiber by taking advantage of the characteristic of maintaining the profile of the frequency spectrum, and reproduces the original signal waveform at a receiver side,
   wherein the optical Fourier transform circuit comprises a phase modulator and a dispersion element, and
   a chirp rate K of phase modulation by the phase modulator and a group velocity dispersion D by the dispersion element satisfy a relationship of K=1/D.

* * * * *